Feb. 13, 1945.   C. A. BEATTY   2,369,274
EGG FRYING MACHINE
Filed July 24, 1944
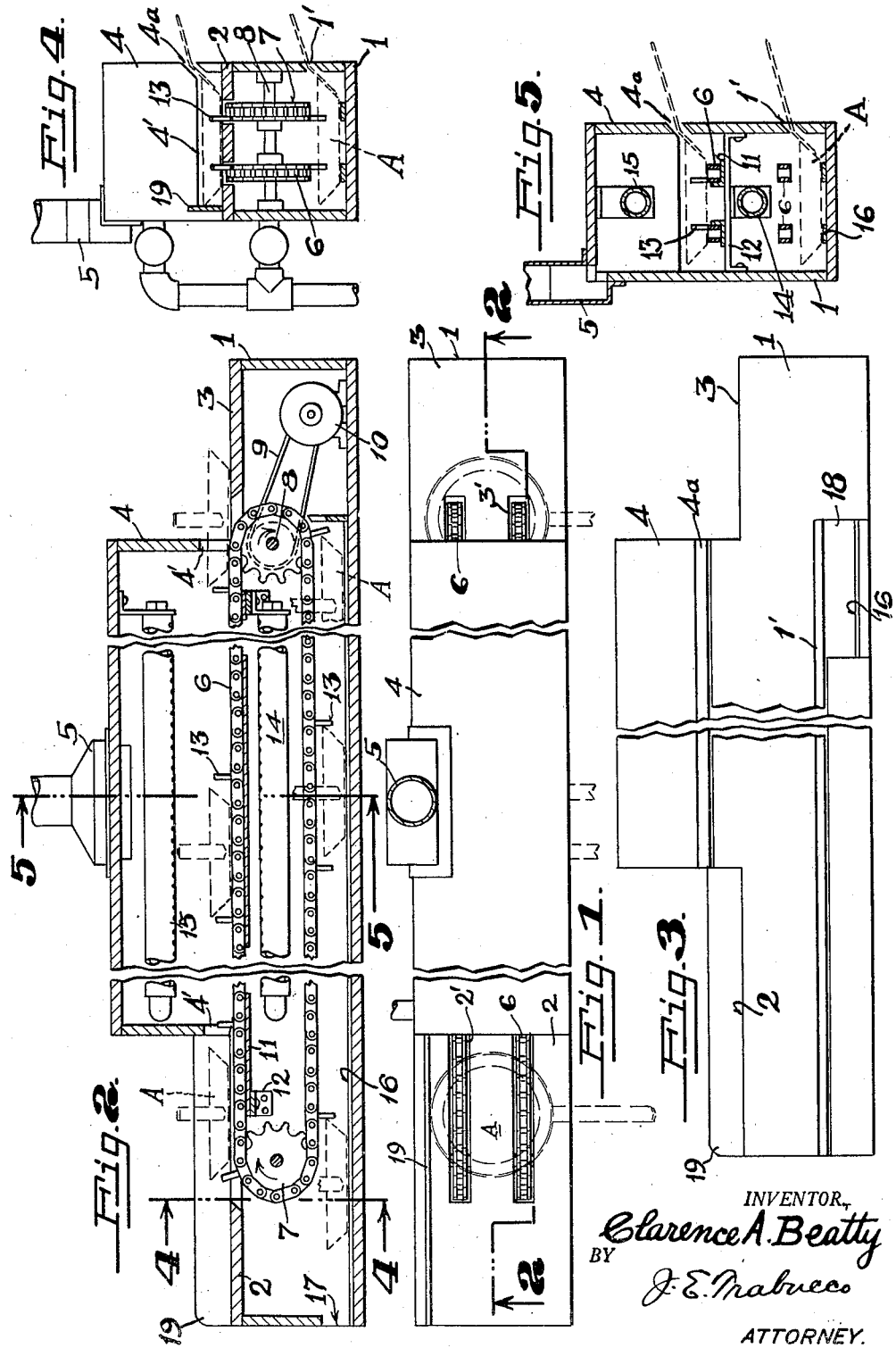
INVENTOR,
Clarence A. Beatty
BY
J. E. Malvece
ATTORNEY.

Patented Feb. 13, 1945

2,369,274

UNITED STATES PATENT OFFICE 2,369,274

EGG FRYING MACHINE

Clarence A. Beatty, San Francisco, Calif.

Application July 24, 1944, Serial No. 546,342

3 Claims. (Cl. 99—423)

This invention relates to improvements in cooking apparatus, and more particularly to a novel machine for frying eggs.

An object of this invention is to provide an improved egg frying machine embodying novel means for successively conveying a number of cooking utensils through a cooking oven equipped with means for directing heat from above and below.

Another object of my invention is to provide an improved machine for cooking eggs or other food in frying pans or similar utensils, comprising an endless conveyor having means for carrying a succession of such utensils through a cooking oven at a predetermined speed, and also means for returning the empty utensils back to their starting location.

A further object of my invention is to provide an improved egg frying machine embodying novel automatic means for cooking each of a number of individual orders of eggs for a predetermined period of time, whereby the various orders will be cooked uniformly and without the necessity of handling each order separately in the customary manner.

Other and further objects of this invention will be pointed out hereinafter, or will be indicated in the appended claims, or will be obvious to one skilled in the art upon an understanding of the present disclosure. For the purpose of this application I have elected to show herein certain forms and details of an egg frying machine representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims, short of the true and most comprehensive scope of the invention in the art.

In the accompanying drawing:

Fig. 1 is a top plan view of an egg frying machine embodying the principles of my invention;

Fig. 2 is a sectional view taken on the line 2—2 of Fig. 1;

Fig. 3 is a side view of the machine;

Fig. 4 is a sectional view taken on the line 4—4 of Fig. 2; and

Fig. 5 is a sectional view taken on the line 5—5 of Fig. 2.

Referring to the drawing, the numeral I designates an elongated enclosure having a substantially horizontal end loading table 2 and a substantially horizontal end receiving table 3. The tables are positioned at opposite ends of the enclosure and each is arranged to partially enclose the same. Between the loading and receiving tables the enclosure is provided with an upper extension or hood 4 which is equipped with a flue 5 for conveying gases of combustion from the interior of the enclosure and its hood.

Positioned in the enclosure is an endless conveyor comprising two spaced chains 6 extending over sprocket wheels 7 which are secured to rotatable end shafts 8. One of the sprocket wheels 7 is connected by a belt 9 to an electric motor 10 which is associated in the usual manner with speed reducing gears and speed varying means (not shown) for regulating the traveling speed of the conveyor. The two endless chains 6 are prevented from sagging at their upper flights by horizontally disposed rigid members 11 which are supported by transverse braces 12 secured to opposite sides of the enclosure. The two chains 6 of the endless conveyor extend through slots 2' and 3' provided in the loading and receiving tables 2 and 3 respectively. The upper flight of the endless conveyor is in substantially alignment with the upper surface of the end tables, thereby permitting a number of frying pans A or other suitable handle equipped cooking utensils to be successively slid from the loading table 2 onto the endless conveyor and thereafter automatically discharged from the latter onto the receiving table 3. At spaced intervals the chains 6 are provided with pairs of transversely aligned projecting members 13 which engage with a utensil at opposite sides thereof and automatically align it on the conveyor and also prevent its displacement while being conveyed through the enclosure. As the endless conveyor travels over the sprocket wheels 7 succeeding pairs of projecting members 13 come into engagement with the trailing edges of the utensils as they are slid one after another by an operator in a backward direction over the slots 2' of the loading table. The utensils being circular are each readily seated on the endless conveyor as each pair of projecting members 13 is carried upwardly and into engagement with the edges of a utensil.

Positioned in the enclosure I between the sprockets 7 and preferably just beneath the upper flight of the endless conveyor is an elongated gas burner 14 or other suitable heating element which is arranged to direct heat upwardly upon the underneath side of the utensils A as they are conveyed through that part of the enclosure located between the ends of the hood 4. The opposite ends of the hood are provided with openings 4' for the passage therethrough of the utensils, and similarly a side of the hood is provided with an elongated horizontal slot 4a for permitting the handles of the utensils to project outwardly and move therethrough as they are conveyed through the enclosure. With the handles projecting outwardly, the utensils are under the control of the operator while traveling through the enclosure. Positioned in the hood 4 above the upper flight of the endless conveyor is an upper gas burner 15 or other suitable heating element which is arranged to direct heat downwardly upon the eggs or other food carried by the utensils.

The burners 14 and 15 are connected in the usual manner to a source of gas supply, and suitable hand and thermostatic controls (not shown) are provided for regulating the heat in the enclosure.

Supported at the bottom of the enclosure directly beneath the lower flight of the endless conveyor is a horizontal utensil support 16, one end of which is positioned near the receiving table 3 and the other end of which terminates at a utensil discharge opening 17 at that end of the enclosure located near the loading table 2. The front side of the enclosure near the receiving table 3 is provided with an opening 18 through which utensils may be successively passed to deposit them on the support 16. A longitudinal horizontal slot 1' in the front side of the enclosure permits the handles of the utensils to project therethrough. The projecting members 13 of the endless conveyor as they are carried downwardly engage with the sides of the utensils placed by an operator on the support 16, and thereafter cause them to slide toward and be successively discharged through the discharge opening 17. The utensils are thereby returned to that end of the enclosure where the loading operations are carried on. A side buffer 19 arranged at the rear side of the loading table 2 facilitates the positioning of the utensils where they can be picked up by the receiving end of the conveyor.

The utensils A with uncooked eggs or other food therein are placed by the operator onto the loading table 2 in positions where they may be successively picked up by the endless conveyor. The speed of the conveyor and the heat in the enclosure being under the control of the operator insure the proper cooking of the eggs or other food during the time a utensil is traveling from the loading to the receiving table.

What I claim is:

1. In cooking apparatus, an elongated enclosure having heating elements therein, slotted utensil loading and receiving tables arranged in substantially horizontal alignment at opposite ends of the enclosure, an endless utensil conveyor located in the enclosure carrying outwardly projecting spaced utensil engaging members and having its upper flight arranged in substantial alignment with the said tables, one end of the upper flight extending into the slotted loading table, whereby utensils placed thereon may be successively engaged by the projecting members and held on the endless conveyor while they are carried through the enclosure to the receiving table, and a utensil support located directly beneath and extending substantially the entire length of the lower flight of the endless conveyor, whereby empty utensils placed thereon will be successively engaged by the projecting members of the lower flight of the endless conveyor and carried to that end of the enclosure located near the loading table.

2. In cooking apparatus, an elongated enclosure having heating elements therein, slotted utensil loading and receiving tables arranged in substantial horizontal alignment at opposite ends of the enclosure, an endless utensil conveyor located in the enclosure carrying outwardly projecting and spaced utensil engaging members and having its flights arranged one above the other with the upper flight in substantial alignment with the said tables, one end of the upper flight extending into the slotted loading table, whereby utensils placed thereon may be successively engaged by the projecting members and held on the endless conveyor while they are carried through the enclosure to the receiving table, and an elongated utensil support located directly beneath and extending substantially the entire length of the lower flight of the endless conveyor, whereby empty utensils placed thereon through a loading opening in the enclosure will be successively engaged by the projecting members of the lower flight of the conveyor and carried to a discharge opening in the enclosure located near the loading table.

3. In cooking apparatus, an elongated enclosure having heating elements therein, an endless utensil conveyor located in the enclosure carrying outwardly projecting and spaced utensil engaging members and having its flights arranged one above the other, means at one end of the table for supporting utensils in positions whereby they may be engaged by the projecting members of the endless conveyor and retained on the upper flight thereof while they are conveyed through the conveyor, an elongated slot in the side of the enclosure extending substantially the full length of the upper flight of the endless conveyor and arranged to permit the projection of the handles of utensils outwardly through the said side of the enclosure as they are conveyed therethrough, whereby the utensils may be controlled by an operator during their movement through the enclosure.

CLARENCE A. BEATTY.